United States Patent [19]

Stirling

[11] Patent Number: 5,314,622

[45] Date of Patent: May 24, 1994

[54] DUAL PURPOSE OXYGENATOR

[75] Inventor: Thomas E. Stirling, Sugarloaf, Pa.

[73] Assignee: Hazleton Environmental, Hazleton, Pa.

[21] Appl. No.: 387,208

[22] Filed: Jul. 31, 1989

Related U.S. Application Data

[62] Division of Ser. No. 39,989, Apr. 20, 1987, abandoned.

[51] Int. Cl.⁵ ............................................. C02F 3/02
[52] U.S. Cl. ..................................... 210/629; 210/758
[58] Field of Search ................ 210/219, 220, 629, 758

[56] References Cited

U.S. PATENT DOCUMENTS

| | | | |
|---|---|---|---|
| 3,827,679 | 8/1974 | Kaelin | 210/219 X |
| 3,957,633 | 5/1976 | Gatti et al. | 210/220 X |
| 4,002,561 | 1/1977 | Traverse | 210/219 X |
| 4,309,285 | 1/1982 | Gallaher, Sr. | 210/219 X |

*Primary Examiner*—Thomas Wyse

[57] ABSTRACT

Dual purpose apparatus and process for increasing the efficiency of absorption of oxygen by a biodegradable waste in a continuous operation in a waste collection station and for removing the oxygen enriched waste from the collection station by separately introducing waste and oxygen, which may be air, into a collector under a highly agitated state, and agitating the air and waste under pressure in a collector by a partially recessed vortex type impeller as back pressure is provided to the collector either by a nozzle means or an outlet means. The collector is mis-matched relative to the impeller to increase the retention and mixing time of the air and waste in the collector. The oxygen enriched waste is removed from the collector either by the nozzle means into the waste water in which the apparatus may be immersed, or the outlet means, wherein said outlet means also serves to remove the waste from the collection station, said nozzle means or said outlet means being alternatively actuated with regard to the passage of waste there through by a value diverting means.

1 Claim, 2 Drawing Sheets

DUAL PURPOSE OXYGENATOR

This is a divisional of copending application Ser. No. 039,989 filed on Apr. 20, 1987, now abandoned.

BACKGROUND OF THE INVENTION

The treatment of waste water such as sewage or other biodegradable materials under pressure by air or oxygen is known to the art.

Such treatment has been done as a batch process in a pressurized vessel as disclosed in U.S. Pat. No. 3,477,581.

While the process of U.S. Pat. No. 3,477,581 is an advance in the treatment of sewage and other waste water, it requires one or more relatively large pressurized tanks and is not suited for a continuous process or for systems for small communities which may otherwise use septic tanks and the like.

The pressurization of the waste water as disclosed in U.S. Pat. No. 3,477,581 will increase the absorption rate of the oxygen used, but requires closed tanks and is not suited for a continuous process.

U.S. patent application Ser. No. 903,506 teaches an apparatus which is adaptable for use in a continuous process for adding oxygen to biodegradable sewage to permit the aerobic reduction of the sewage by organic means. This apparatus has marked advantages over the prior art in that it allows for a continuous process to introduce oxygen under pressure into biodegradable waste products. In addition, the apparatus will function in relatively shorter periods of time and in relatively lower levels of water then was capable in any prior art process or apparatus.

The apparatus described in said U.S. patent application has many uses and is advantageously employed in combination with a pump means to remove the oxygen enriched biodegradable waste products from a treating station. For example, in collection stations, it is common to place collection sumps in locations where gravity piping will be too deep for the continuation of the pipeline. The sumps are provided with a pump and float control to pump down the sump, i.e. to remove the wastes therefrom, when it becomes full. Since the sewage or waste water may be anaerobic or become anaerobic during its residence in the sump, obnoxious odors result. These sumps may be located within city areas, in which case such odors would be extremely objectionable. It follows, therefore, that the apparatus can be advantageously used in wet well collection stations to deliver oxygen under pressure into waste products to thereby promote the biodegradability of the waste materials. However, the apparatus is not, as described in said patent application, capable of also pumping the treated waste out of the collection station and therefore, as indicated above, it has to be used in combination with a conventional pump.

DESCRIPTION OF THE INVENTION

An object of the present invention is to provide for an improved dual purpose apparatus, which is alternatively referred to herein as an oxygenator, which serves, depending on the selected mode of operation, to both introduce oxygen into biodegradable waste under pressure and also to move said treated biodegradable waste from the area in which it is collected. Another object of the present invention is to eliminate the need to use a separate pump means in a wet well waste collection station to remove treated waste from said collection station.

These and other objects of the invention which will appear from time to time as the following specification proceeds will be accomplished according to the teachings of the specification and the accompanying drawings wherein.

Figure 1:
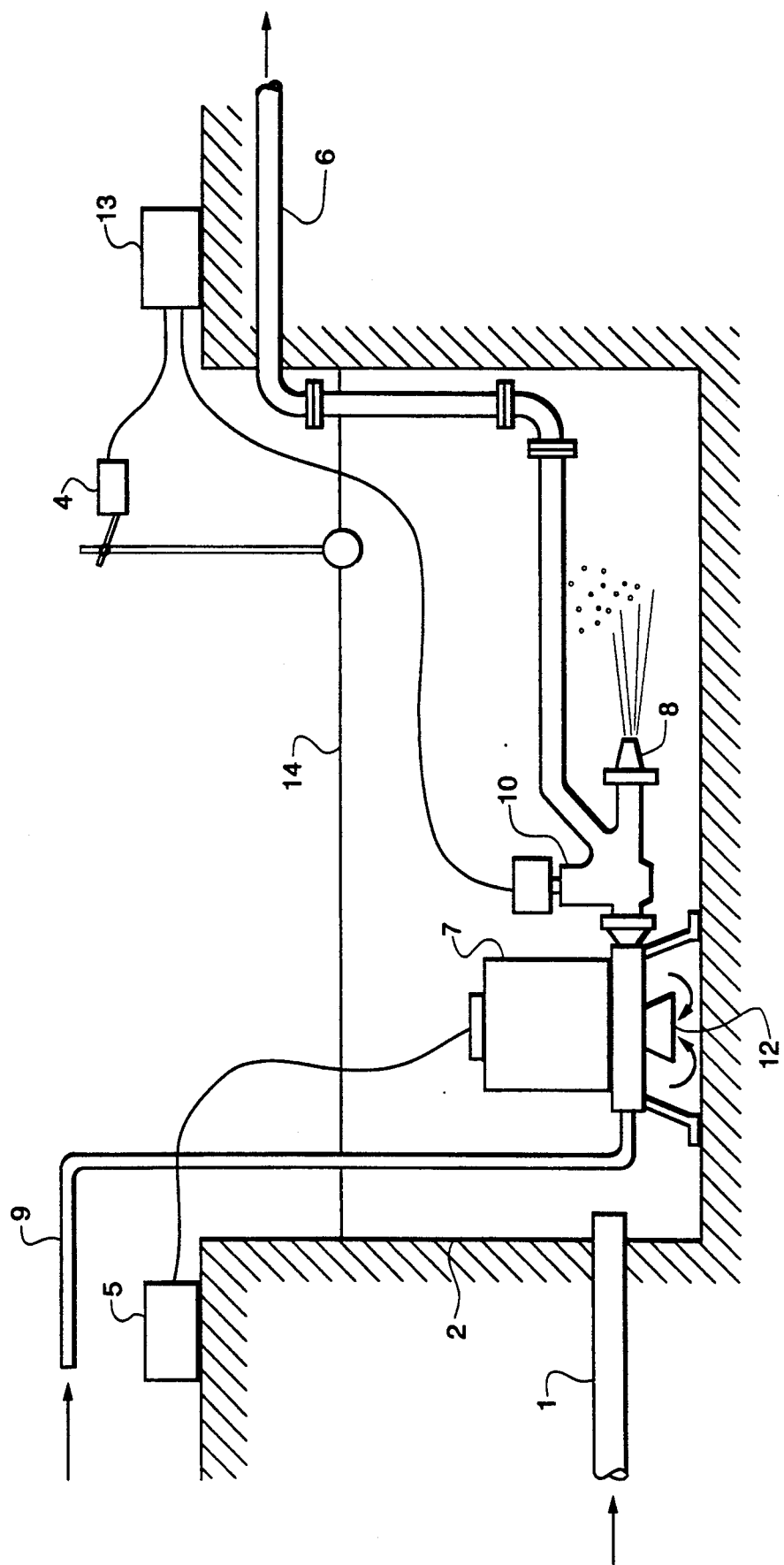
FIG. 1 is a diagrammatic view of a sewage treatment collection station utilizing the principles of the present invention.
Figure 2:
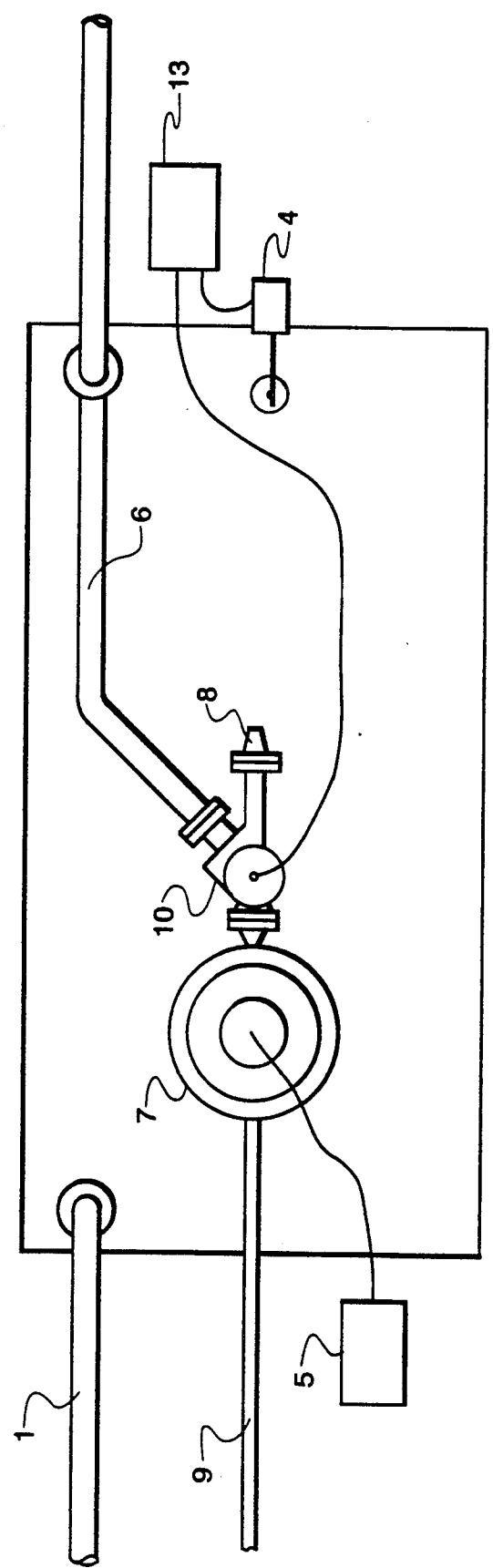
FIG. 2 is a diagrammatic overview of the modified oxygenator utilized in the present invention.

With reference to the figures, the dual purpose oxygenator 7, which typically is driven by a conventional submersible type motor (not shown) powered by external power source 5, of the present invention may be installed in tank 2, which may be a conventional holding tank similar to the tanks commonly employed in municipal or industrial settings wherein the retention time for the sewage may be sufficient for anaerobic conditions to develop.

Waste water containing oxidizable biodegradable matter is received into tank 2 through a waste water inlet means 1, and passes into oxygenator 7 through inlet port 12, which preferably is a venturi-like nozzle. Oxidizing gas, which may be air or pure oxygen, is introduced, either using the suction effect produced by the venturi-like nozzle or an external pressurizing system (not shown), into oxygenator 7 via air inlet means 9.

When oxygenator 7 is functioning as a pump, the oxidized waste material will pass from oxygenator 7 via collection station outlet means 6, entry to which for the waste material is controlled by diverting valve means 10, which is actuated with regard to outlet means 6, to pass waste therethrough, by level control 4 when the fluid level 14 within tank 2 rises to a predetermined level. Outlet means 6 can be a conventional discharge pipe. When valve means 10 is not actuated by level control 4, oxidized waste materials will pass out from oxygenator 7 through at least one back pressure nozzle means 8, which is located on the down stream side of valve means 10. Level control 4 will perferably actuate valve means 10 by power means 13.

When oxygenator 7 is functioning as a pump, air will continue to be aspirated therein through inlet pipe 9 into oxygenator 7 and the waste material discharged therefrom into outlet means 6 will be in aerobic or near aerobic condition.

The oxygenator utilized in the present invention employs a partially recessed vortex type impeller, which impeller is mis-matched with a casing which, for the purposes of this application, is termed a collector. The agitaton caused by the impeller and the pressure within the collector results in a rapid absorption rate of oxygen by the biodegradable waste.

The collector is oversized, relative to the impeller, and back pressured either by nozzle means 8 or outlet means 6 to provide the absorption of oxygen by the waste under high agitation and pressure in the mixing chamber which is formed by the oversized interior of the collector. By extending the duration of mixing and pressure in the collector there is achieved a maximum absorption rate of oxygen. Air or oxygen is mixed as it is admitted into the interior of the collector along an axis coaxial with the center of rotation of the impeller.

The impeller utilized in the apparatus of the present invention is a partially recessed, vortex-type impeller in which some, but not all, of the vanes of said impeller are extended partially into the mixing chamber. Certain of the impeller vanes will also contain, in the bases thereof, air relief holes to prevent the air binding of the impeller.

The impeller/collector combination will be preferably designed for operation close to the oxygenator's shut-off condition since it has been discovered that this condition serves to increase the mixing rate and the retention time of the biodegradable waste material which are oxidized therein.

The interior inlet (not shown) for air or oxygen under pressure will preferably encircle the inlet for waste water (not shown) in the collector. The two coaxial inlets are of a venturi-type, to aspirate air or oxygen directly into the waste water.

In a specific embodiment of this inventor the oxygenator generally comprises a means for agitating waste material and either inserting pressurized gas or otherwise inducing gas therein, said means having an impeller which, as indicated above, is preferably a partially recessed vortex-type impeller. A collector, mis-matched relative to said impeller, encloses the impeller in such a manner as to form a relatively large volumned chamber. The collector further comprises an inlet for biodegradable waste which leads into the collector axially of the impeller, and also an inlet for air into said collector. The two inlets will cooperate with the vortex created by the impeller to effect the induction and agitation of air and biodegradable waste entering the collector. The oxygenator further comprises at least one back pressure outlet leading from the collector which serves to create a back pressure in the collector and further cooperates with the inlets and impeller to effect an increased absorption of oxygen into the biodegradable waste prior to discharge through either said back pressure outlet and into the waste water in which the oxygenator may be immersed, or, when the oxygenator is acting as a pump, through a collection station outlet means.

In the process of the present invention biodegradable waste and oxygen, which may be air, are separately introduced into a collector under a highly agitated state, and are agitated in the collector by a partially recessed vortex type impeller as back pressure is provided to the collector either by a nozzle means or an outlet means. The collector is mis-matched relative to the impeller to increase the retention and mixing time of the air and waste in the collector. The oxygen enriched waste is removed from the collector either by the nozzle means into the waste water in which the apparatus may be immersed, or the outlet means, wherein said outlet means also serves to remove the waste from the collection station, said nozzle means or said outlet means being alternatively actuated with regard to the passage of waste therethrough by a value means.

It is understood that the exact form of oxygenator used may be varied in accordance with treating conditions and that I do not desire to be limited to any particular oxygenator described. Various other types of oxygenators which will agitate the biodegradable waste material and cause the air or oxygen to be absorbed in said waste material that are constructed under the principles shown and described herein and come under the scope of the claims of the present invention, may be attained without departing from the spirit and scope of the novel concepts thereof.

What is claimed is:

1. A process for increasing the efficiency of absorption of oxygen by a biodegradable waste in a continuous operation in a waste collection station and for removing the oxygen enriched waste from the collection station, comprising (1) separately introducing the waste and oxygen into a collector; (2) agitating the oxygen and waste under pressure in the collector by a partially recessed vortex type impeller as back pressure is provided to the collector either by a nozzle means or an outlet means, wherein the collector is mis-matched relative to the impeller to increase the retention and mixing time of the air and waste in the collector; and (3) removing the oxygen enriched waste from the collector either by the nozzle means into the waste water in which the apparatus may be immersed, or the outlet means, wherein said outlet means also serves to remove the waste from the collection station, said nozzle means and said outlet means being alternatively actuated with regard to the passage of waste therethrough from the collector by a valve means.

* * * * *